(12) United States Patent
Huo et al.

(10) Patent No.: US 9,541,926 B2
(45) Date of Patent: Jan. 10, 2017

(54) DRIVE DEVICE AND VALVE COMPRISING THE SAME

(71) Applicant: EMERSON PROCESS MANAGEMENT REGULATOR TECHNOLOGIES, INC., McKinney, TX (US)

(72) Inventors: Ping Huo, Chengdu (CN); Yanbo Shi, Sichuan (CN); Xiaojuan Qin, Chengdu (CN)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 14/437,817

(22) PCT Filed: Oct. 22, 2013

(86) PCT No.: PCT/CN2013/085672
§ 371 (c)(1),
(2) Date: Apr. 22, 2015

(87) PCT Pub. No.: WO2014/063609
PCT Pub. Date: May 1, 2014

(65) Prior Publication Data
US 2015/0277450 A1    Oct. 1, 2015

(30) Foreign Application Priority Data
Oct. 22, 2012   (CN) .................... 2012 2 0565977 U

(51) Int. Cl.
*F16K 31/12*     (2006.01)
*G05D 16/08*     (2006.01)
(Continued)

(52) U.S. Cl.
CPC .......... *G05D 16/08* (2013.01); *F16K 31/1262* (2013.01); *F16K 31/1266* (2013.01); *G05D 16/02* (2013.01);
(Continued)

(58) Field of Classification Search
CPC .. F16K 31/1262; F16K 31/1266; G05D 16/08; G05D 16/0661; Y10T 137/7793; Y10T 137/782; Y10T 137/7812; Y10T 137/7809; Y10T 137/7804; Y10T 137/7805
(Continued)

(56) References Cited

U.S. PATENT DOCUMENTS 1,745,256 A * 1/1930 Groble ................ G05D 16/163
                                                    137/484.2
2,333,775 A * 11/1943 Gille ....................... F23N 5/067
                                                    137/495
(Continued)

FOREIGN PATENT DOCUMENTS

CN          2530117 Y        1/2003
CN        201068984 Y        6/2008
(Continued)

OTHER PUBLICATIONS

Search Report for PCT/CN2013/085672, mailed Jan. 23, 2014.
(Continued)

*Primary Examiner* — Jessica Cahill
(74) *Attorney, Agent, or Firm* — Marshall, Gerstein & Borun LLP

(57) ABSTRACT

A drive device and a valve including the drive device. The drive device senses the pressure of a working medium and generates a drive force to control the flow of the working medium. The drive device includes a sensing part with a chamber and a drive shaft. Vents and an air exhausting
(Continued)

device are arranged on the chamber. The drive device and the valve including such a drive device can exhaust air entering the chamber along with the working medium out of the chamber by the vents on the chamber thereby optimizing the performance of the drive device and the valve and helping to keep the valve operating in a stable manner.

20 Claims, 4 Drawing Sheets

(51) Int. Cl.
      *F16K 31/126*     (2006.01)
      *G05D 16/02*      (2006.01)
      *G05D 16/06*      (2006.01)

(52) U.S. Cl.
      CPC ...... *G05D 16/0655* (2013.01); *Y10T 137/7793* (2015.04)

(58) Field of Classification Search
      USPC ............ 137/505.36, 505.29, 505.26, 505.21
      See application file for complete search history.

(56) References Cited

U.S. PATENT DOCUMENTS

| | | | | |
|---|---|---|---|---|
| 3,601,148 A | * | 8/1971 | Jeffrey | .................... B60T 17/18 137/484.8 |
| 3,762,435 A | * | 10/1973 | Auwerter | .............. F16K 31/363 137/505.22 |
| 4,044,792 A | * | 8/1977 | Kjaergaard | ........ G05D 16/0655 137/505.22 |
| 4,235,211 A | | 11/1980 | Sugaya | |
| 5,706,848 A | * | 1/1998 | Taylor | ................... F16K 17/406 137/505.26 |
| 2004/0261859 A1 | * | 12/2004 | Callies | ................ F16K 17/0413 137/495 |
| 2010/0243081 A1 | * | 9/2010 | Zecchi | ............... G05D 16/0647 137/505.36 |

FOREIGN PATENT DOCUMENTS

| | | |
|---|---|---|
| CN | 201129513 Y | 10/2008 |
| CN | 201376502 Y | 1/2010 |
| CN | 101761677 A | 6/2010 |
| CN | 102498323 A | 6/2012 |
| CN | 102734515 A | 10/2012 |

OTHER PUBLICATIONS

International Preliminary Report on Patentability and Written Opinion from International Application No. PCT/CN2013/085672, dated May 7, 2015.

* cited by examiner

DRIVE DEVICE AND VALVE COMPRISING THE SAME

TECHNICAL FIELD

The present disclosure relates to a drive device for sensing medium pressure and a valve including the drive device.

BACKGROUND ART

At present, a drive device and a valve including the drive device, such as actuator and adjusting valve comprise a sealing chamber; when the working medium is charged in the chamber, the air in the working medium can enter the chamber; it always exists the state of mixing the air and the working medium is in the chamber; if the working medium is the liquid, the compressed air and uncompressed liquid exit in the drive device together. Although the drive device can work, it is not stable.

Specifically, with reference to FIG. 1, a valve 1 includes a drive device 10 and a sensing chamber 13 formed by the shell 11 and the membrane 12 of the drive device. The membrane 12 is connected with a drive shaft 14. The membrane 12 can sense the pressure in the chamber and drive the drive shaft 14; the drive shaft 14 further drives the valve core component 15 to control the working medium. When the air in the working medium enters the valve, the working medium can enter the sealed chamber of the drive device so that the air in the chamber cannot be discharged; it is always the mixed state of air and working medium in the chamber: the greater of the volume of the chamber, the more of the air, which means that the chamber has less and less of the working medium held in the chamber. As the capacity of the working medium in the chamber is small, the pressure of working medium sensed by the membrane is not accurate, which results in an unstable valve.

BRIEF SUMMARY

The present disclosure provides a more stable drive device and a valve including such a drive device.

In accordance with a first exemplary aspect of the invention, a drive device is provided for sensing the pressure of a working medium and generating a drive force to control the flow of the working medium. The drive device includes a sensing part which includes a chamber and a sensing device located in or above the chamber. Vents are arranged on the chamber. The drive device includes a drive shaft which passes through the chamber. One end of the drive shaft is connected with the sensing device, which senses the pressure of the working medium and drives the drive shaft to move based on the sensed pressure.

In accordance with a second exemplary aspect of the invention, a valve is provided which is adapted to be connected with a main fluid pipeline to the pressure in the main fluid pipeline. The valve includes a drive device and a valve body connected to the drive device. The valve body includes an inlet chamber and an outlet chamber. The inlet chamber is adapted to be connected to the upstream pipeline of the main pipeline and the outlet chamber is adapted to be connected to the downstream pipeline of the main pipeline. A flow control device is arranged between the inlet chamber and the outlet chamber. The flow control device controls the flow of the working medium in the valve body. The drive device includes a sensing chamber and a drive shaft. The sensing chamber includes a membrane and a shell. The drive shaft has one end connected to the membrane and another end connected to the flow control device. The membrane is configured to sense the pressure of the sensing chamber and drive the drive shaft to move based on the sensed pressure. The drive device also includes vents arranged on the shell.

In further accordance with the foregoing first or second exemplary aspects, a drive device and/or a valve may include any one or more of the following further preferred forms.

In one preferred form, the chamber of the drive device includes a shell and the sensing device is a membrane. The working medium is in communication with the shell. When the working medium enters the chamber, the membrane senses the pressure change of the working medium and drives the drive shaft to move based on the sensed pressure change.

In another preferred form, the vents on the chamber of the drive device discharge the air entering the chamber along with the working medium to improve the stability of the drive device.

The drive device described herein can be used in different devices, such as a valve, any type of regulator, and the like, to control or adjust the pressure or flow of the working medium.

In another preferred form, the shell of the sensing chamber of the valve is provided with a first connecting pipeline, and the vents are located vertically above the connection position of the first connecting pipeline and the shell.

In another preferred form, the first connecting pipeline of the valve is arranged between the shell and the downstream pipeline of the main pipeline, and a second connecting pipeline is arranged between the vent and the downstream pipeline of the main pipeline. The connection position of the second connecting pipeline and the downstream pipeline of the main pipeline is located downstream of the connection position of the first connecting pipeline and the downstream pipeline of the main pipeline.

In another preferred form, the first connecting pipeline of the valve is arranged between the shell and the upstream pipeline of the main pipeline, and the second connecting pipeline is arranged between the vent and the upstream pipeline of the main pipeline. The connection position of the second connecting pipeline and the upstream pipeline of the main pipeline is located downstream of the connection position of the first connecting pipeline and the upstream pipeline of the main pipeline.

In another preferred form, the vents of the valve are connected with the air exhausting device which controls the gas discharged from the sensing chamber.

In another preferred form, the air exhausting device of the valve is a bulkhead or a vent valve.

In another preferred form, the flow control device of the valve is a clack valve which is arranged at the end of the drive shaft, and the valve body further includes a valve opening arranged in the valve body between the inlet chamber and the outlet chamber. The clack valve is movable relative to the valve opening, and along with the movement of the drive shaft, the clack valve and the valve opening form the opening and closing states.

In accordance with a third exemplary aspect of the invention, a valve includes a drive device. Vents are arranged on the sensing chamber of the drive device. The vents are located above the sensing chamber such that the sundries gas enters the sensing chamber along with the working medium. The sundries gas, having a low density, is located above the chamber, and the working medium, having a greater density than the sundries gas, is located below the chamber; thus, the vents can easily discharge the air in the sensing chamber to keep the valve operating in a stable manner.

In some cases, the vents are connected with a bulkhead or air exhausting valve to manually discharging the air. When the valve is operational, the bulkhead or air exhausting valve can be regularly opened to discharge the air retained in the sensing chamber.

In other cases, the vents are connected with the second connecting pipeline. The other end of the second connecting pipeline is connected with the main pipeline, which benefits the automatic circulation of the working medium. The air mixed in the working medium of the sensing medium is discharged to the main pipeline to achieve the discharging effect and form the automatic circulation passage of the working medium in the valve; in this manner, automatic discharging can be achieved, and the pressure of the working medium can be stabilized.

DETAILED DESCRIPTION OF THE DRAWINGS

Figure 1:
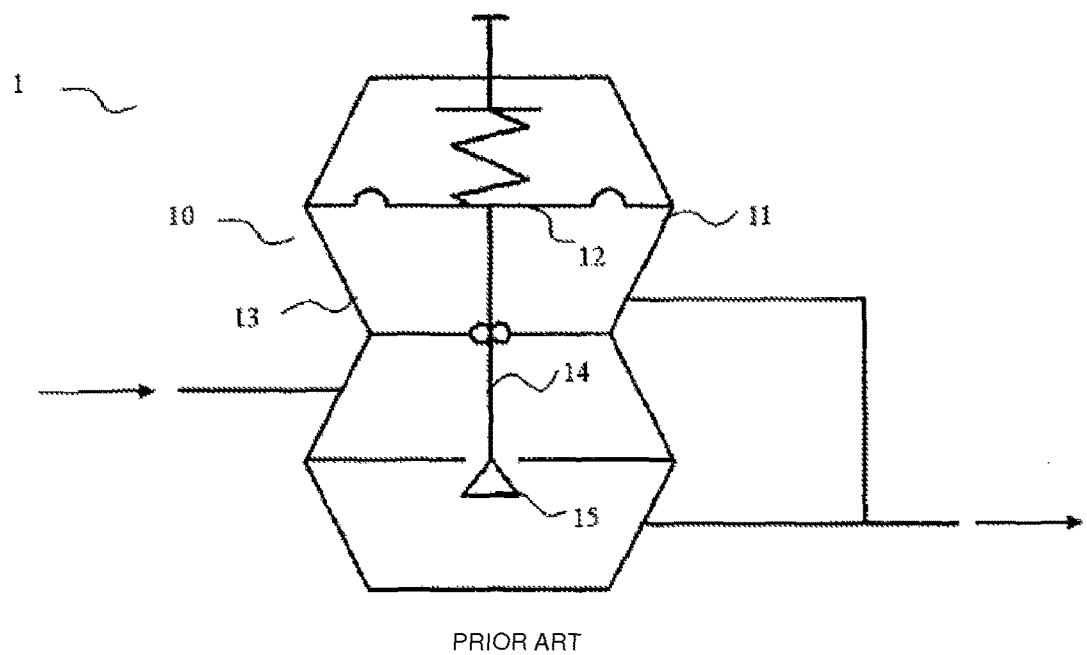
FIG. 1 is a schematic diagram of a valve including a conventional drive device.

The following will describe the preferable embodiments with reference to the drawings which constitute one part of the present invention. The attached drawings illustrate the specific embodiments for achieving the present invention by way of example. The illustrated embodiments are not intended to limit all of the embodiments of the present invention. It may be appreciated that without departing from the scope of the present invention, other embodiments may be used, or some structural or logical changes may be possible. Therefore, the following specific explanations are not meant as a limitation of the present invention, and the scope of the present invention is defined by the attached claims.

Example 1

According to one aspect of the present invention, a drive device used for sensing the pressure of the working medium flowing through the drive device is provided. The drive device includes a sensing part and a drive shaft. The sensing part is used for sensing the pressure of the working medium and generating the drive force by the drive shaft. The sensing part specifically includes a chamber and a sensing device.

The sensing device is connected with the drive shaft. Because the working medium is in communication with the chamber and enters the chamber, the sensing device can sense the pressure of the working medium in the sensing chamber. The drive shaft is driven to move according to the pressure of the working medium. Vents are arranged on the chamber of the drive device, such that air entering the chamber of the drive device along with the working medium can be discharged. Specifically, the vents are connected with an air exhausting device which can, for example, be the exhausting pipeline or valve.

In addition, in some cases, the drive device can be used for the adjusting valve or control valve.

When the drive device is used for the adjusting valve, the sensing device of the sensing part of the drive device is a membrane, which can, together with the shell, form the chamber of the sensing device. The chamber can directly sense the pressure of the working medium and drive the drive shaft by way of the membrane. The membrane is connected with the drive shaft, such that the membrane can sense the pressure in the chamber and drive the drive shaft. Due to sensing the pressure, the chamber is sealed; when the air in the working medium enters the chamber, the air is separated from the working medium and located above the working medium. There are vents above the chamber, for example, arranged on the shell, and the air above the chamber can be discharged out of the device by the vents.

When the drive device is used for the control valve, the drive device can be the driver composed of other electronic sensing element, which includes the chamber, the sensing device and the drive shaft; the sensing device can sense the pressure of the working medium charged in the chamber and delivered the pressure to the drive shaft by the electric signal to drive the drive shaft to perform the related operation. During the process, the vents above the chamber can discharge the air mixed in the working medium out of the chamber to keep the drive device stable and the control valve including the drive device.

Example 2

Figure 2:
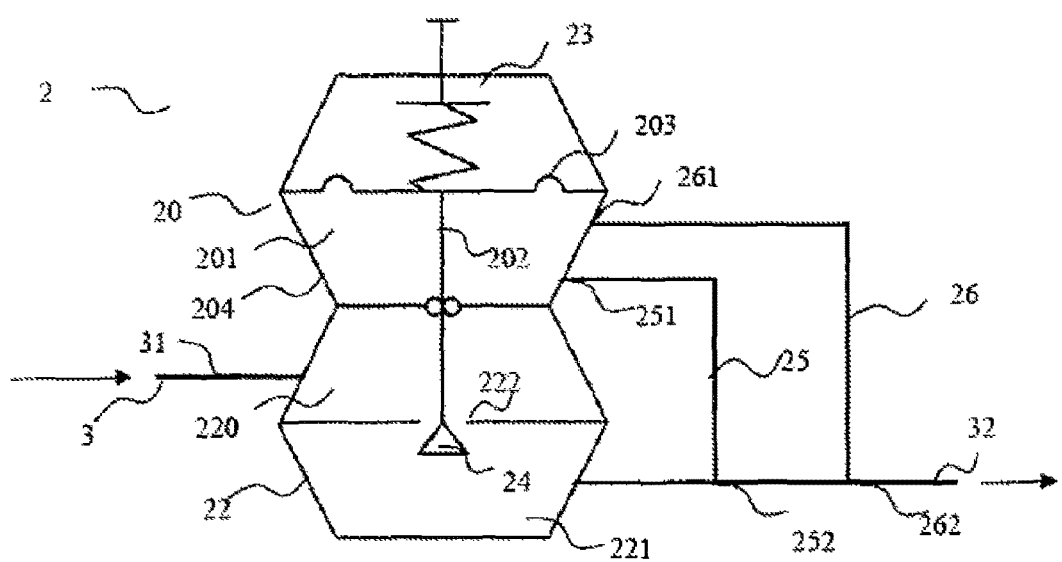
FIG. 2 is a schematic diagram of a valve including a drive device and constructed in accordance with the teachings of the present invention.

According to another aspect of the present invention, a valve 2 is provided that includes the drive device discussed above in connection with example 1. Specifically, as shown in FIG. 2, the valve 2 is connected with the main fluid pipeline 3 and is capable of controlling the pressure of the working medium in the main pipeline. The valve 2 includes a drive device 20, a valve body 22, and an adjusting device 23, and the working medium is liquid fluid.

The drive device 20 includes a sensing chamber 201 and a drive shaft 202. The sensing chamber 201 includes the membrane 203 and the shell 204. When the valve is in the open state, the working medium flows into the sensing chamber 201. The membrane 203 can sense the pressure of the working medium and moves according to the pressure of the working medium in the sensing chamber 201. As the membrane 203 is connected with one end of the drive shaft 202, when the membrane 203 moves according to the pressure change in the sensing chamber, the drive shaft 202 moves, correspondingly, in a similar manner.

The valve body 22 includes an inlet chamber 220 and an outlet chamber 221 as well as a valve opening 222 located between the inlet chamber 220 and the outlet chamber 221 of the valve body. The inlet chamber 220 is connected to the upstream pipeline 31 of the main pipeline, and the outlet chamber 221 is connected to the downstream pipeline 32 of the main pipeline. A flow control device 24 is arranged between the outlet chamber 221 and the inlet chamber 220 to control the flow of the working medium in the valve. The flow control device 24 is connected with one end of the drive shaft 202. The flow control device 24 can, for example, be a clack valve connected with one end of the drive shaft 202. The clack valve 24 matches with the valve opening 222 to form the opening and closing states between the inlet chamber 220 and the outlet chamber 221.

Specifically, when the amount of the working medium of the downstream pipeline 32 of the main pipeline is increased, the pressure of the sensing chamber 201 is decreased, so that the membrane 203 drives the clack valve 24 to move downwards under the action force of the adjusting device 23, thereby enlarging the valve opening 222. This increases the flow of the working medium flowing through the upstream pipeline 31 of the main pipeline, raising the pressure of the outlet chamber 221 to maintain (i.e., keep constant) the downstream pressure of the main pipeline. Conversely, when the amount of the working medium of the main pipeline downstream 32 is decreased, the pressure of the sensing chamber 201 is raised, so that the membrane 203 drives the clack valve clack 24 to move upwards under the action force of the adjusting device 23, thereby decreasing the valve opening 222. This decreases the flow of the working medium flowing through the upstream pipeline 31 of the main pipeline to maintain (i.e., keep constant) the pressure of the downstream pipeline 32 of the main pipeline.

The adjusting device 23 is used for presetting the standard pressure of the working medium at the downstream pipeline 32 of the main pipeline of the valve. When the membrane moves responsive to the pressure of the working medium in the sensing chamber 201, the adjusting device 23 can generate a relative force according to the moving range of the membrane 203: on one hand, the adjusting device 23 can buffer the moving range of the membrane, while on the other hand, the pressure of the working medium at the downstream pipeline 32 of the main pipeline can be kept at the preset pressure value. Specifically, the drive shaft 202 drives the flow control device 24 to match with the valve opening 222, so that the flow flux of the working medium between the inlet chamber 220 and the outlet chamber 221 is kept in the stable range, and the pressure of the working medium flowing in the downstream pipeline 32 of the main pipeline is kept at the preset standard pressure.

The valve 2 in this example is provided with a first connecting pipeline 25, a second connecting pipeline 26, and vents 261 on the shell 204 of the sensing chamber 201 of the valve. Specifically, one end of the first connecting pipeline 25 is arranged on the shell 204 of the drive device 20, with the connecting opening being the first interface 251. The other end of the first connecting pipeline 25 is provided with a second interface 252. One end of the second connecting pipeline 26 is connected with the vents 261, and the other end of the second connecting pipeline 26 is the third interface 262. The vents 261 on the shell are located above the first interface 251. The pressure of the working medium at the third interface 262 is less than that of the working medium at the second interface 252.

The second interface 252 of the first connecting pipeline 25 can be arranged on the downstream pipeline 32 or upstream pipeline 31 of the main pipeline or the inlet chamber 220 or outlet chamber 221 of the valve 2. Wherever the second interface 252 of the second connecting pipeline is or whether the valve is installed forward, backwards or side on the main pipeline, the pressure of the working medium at the second interface 252 is greater than that of the working medium at the third interface 262 of the second connecting pipeline 26. Meanwhile, the first connecting pipeline 25 is arranged above the first interface 251 of the shell 204 in the vertical direction and always below the vent 261 of the shell 204.

Preferably, as shown in FIG. 2, the first connecting pipeline 25 is arranged between the shell 204 and the downstream pipeline 32 of the main pipeline. More specifically, the first interface 251 is located on the shell 204 of the sensing chamber 201, and the second interface 252 is located on the downstream pipeline 32 of the main pipeline. When the working medium flows into the inlet chamber 220 from the upstream pipeline 31 of the main pipeline and flows into the downstream pipeline 32 of the main pipeline by the valve opening 222 and the outlet chamber 221, the working medium enters the sensing chamber 201 via the second interface 252, the first connecting pipeline 25, and the first interface 251. The pressure of the working medium at the downstream pipeline 32 of the main pipeline is thus delivered to the sensing chamber 201 of the drive device 20 by the first connecting pipeline 25. The sensing chamber 201 drives the drive shaft 202 in a corresponding manner according to the pressure of the working medium. During the moving process, the drive shaft 202 drives the flow control device 24 at the other end, and the flowing control device 24 matches with the valve opening 222 to form the opening and closing states between the inlet chamber 220 and the outlet chamber 221.

Specifically, when the amount of the working medium of the downstream pipeline 32 of the main pipeline is increased, the pressure of the sensing chamber 201 is decreased, so that the membrane drives the clack valve 24 downwards under the action force of the adjusting device 23. This enlarges the opening of the clack valve 24 and the valve opening 222, increasing the flow of the working medium through the upstream pipeline 31, which raises the pressure of the outlet chamber 221 to maintain (i.e., keep constant) the downstream pressure of the downstream pipeline 32 of the main pipeline. Conversely, when the amount of the working medium of the main pipeline downstream 32 is decreased, the pressure of the sensing chamber 201 is increased, so that the membrane 203 drives the clack valve 24 upwards under the action force of the adjusting device 23. This decreases the opening of the clack valve 24 and the valve opening 222, decreasing the flow of the working medium through the upstream pipeline 31 of the main pipeline, which helps to maintain (i.e., keep constant) the pressure of the downstream pipeline 32 of the main pipeline.

The vents 261 on the shell are located above the first interface 251; in this way, when the air in the working medium enters the sensing chamber 201, the working medium is separated from the sundries gas which is located above the sensing chamber 201, the working medium is located below the sensing chamber 201, the vents 261, by being located above the first interface 251, can discharge the sundries gas, and the working medium can flow into the downstream pipeline 32 of the main pipeline along with the first connecting pipeline 25. In addition, the first connecting pipeline 25 and the second connecting pipeline 26 are respectively provided with the second interface 252 and the third interface 262 on the downstream pipeline 32 of the main pipeline. In the example, the third interface 262 is located downstream of the second interface 252 at the downstream pipeline 32 of the main pipeline. Because the main pipeline has a pressure differential along the fluid direction, the pressure of the working medium at the second interface 252 is greater than that at the third interface 262.

When the working medium enters the valve from the upstream pipeline 31 of the main pipeline, it flows through the inlet chamber 220 and outlet chamber 221 and flows into the sensing chamber 201 via the second interface 252 and the first connecting pipeline 25. The pressure is further delivered in the sensing chamber 201, so that the drive device 20 drives the flow control device 24. Because the vents 261 connected with the second connecting pipeline 26 are located above the first interface 251 connected with the first connecting pipeline 25, the air in the chamber can be further pressed and discharged from the second connecting pipeline 26 and the working medium mixed with air can flow out from the sensing chamber 201 via the vents 261, the second connecting pipeline 26 and the third interface 262, and can flow to the downstream along with the working medium along the main pipeline. The sensing chamber is always a dynamic chamber by virtue of this the circulation process, thereby maintaining the stability of the valve.

Figure 3:
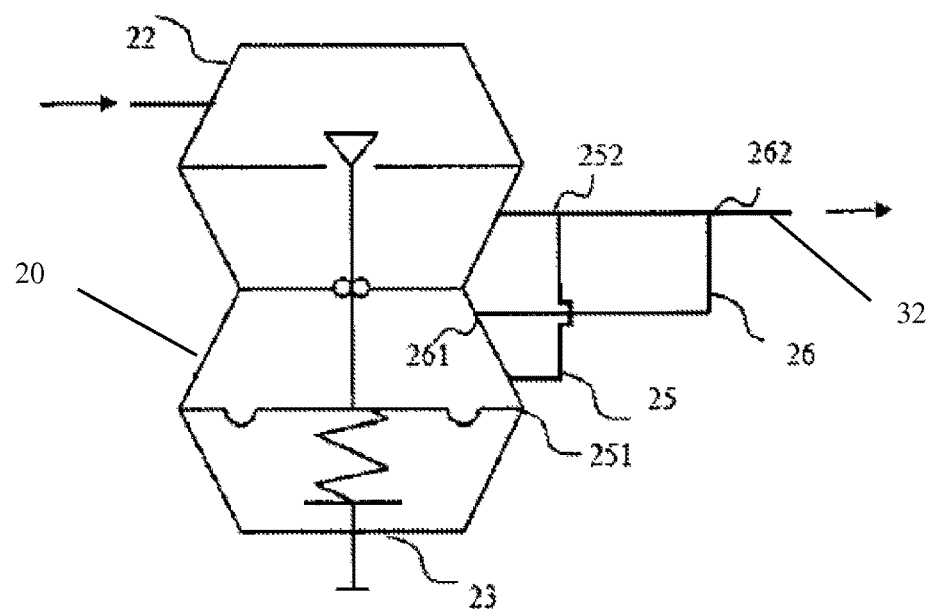
FIG. 3 is a schematic diagram of an inverted valve constructed in accordance with the teachings of the present invention.

On the other hand, while the valve 2 in the illustrated example is installed on the fluid main pipeline, the valve 2 can instead be backwards installed on the fluid main pipeline. For example, as shown in FIG. 3, the adjusting device 23 and the drive device 20 are located below the valve body 22, the second interface 252 of the first connecting pipeline 25 on the downstream pipeline 32 of the main pipeline is located upstream of the third interface 262 of the second connecting pipeline 26 and the main pipeline. Meanwhile, the vents 261 connecting the second connecting pipeline 26 are located vertically above the first interface 251 of the shell in communication with the first connecting pipeline 25, so that the gas above the sensing chamber can be discharged out from the chamber. In addition, the example limits the position of the shell in the vertical direction; on this basis, it can be any position of the circumference surface on the shell over the second interface in the level direction.

Figure 4:
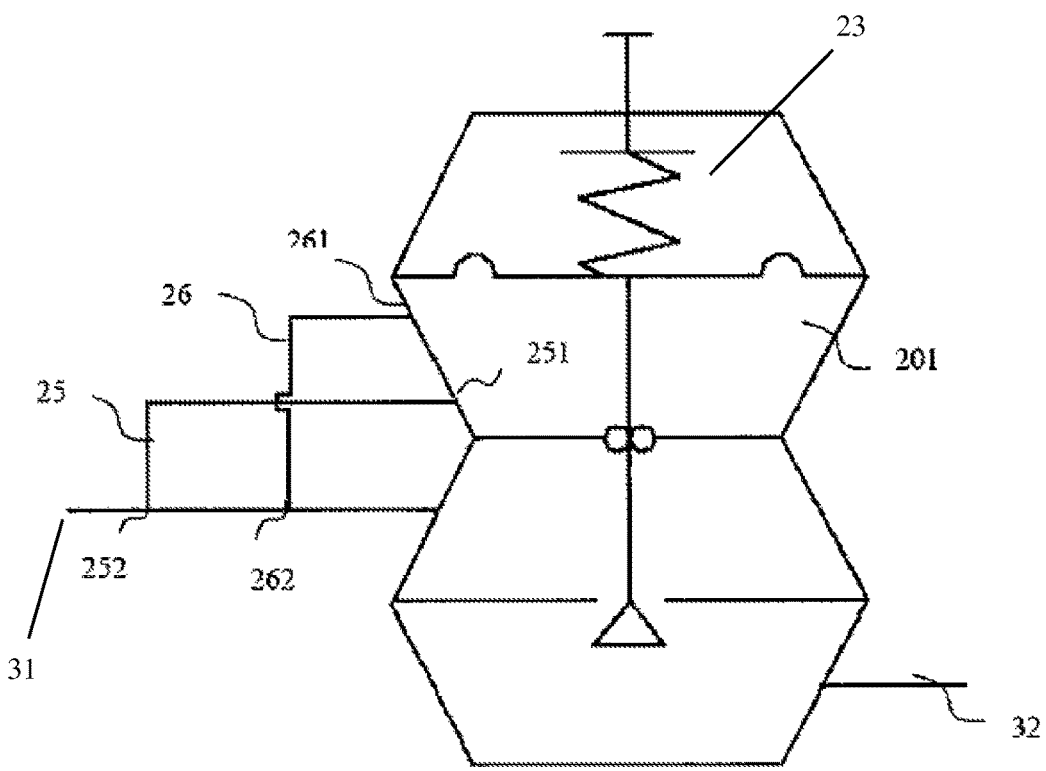
FIG. 4 is a schematic diagram of another valve constructed in accordance with the teachings of the present invention.

When the second interface 252 of the first connecting pipeline 25 is arranged at the upstream pipeline 31 of the main pipeline, as shown in FIG. 4, the third interface 262 of the second connecting pipeline 26 can be arranged at the upstream pipeline 31 of the main pipeline. The second interface 252 is located upstream of the third interface 262 so that the pressure of the working medium at the second interface 252 is greater than that of the working medium at the third interface 262. The working medium in the upstream pipeline of the main pipeline flows into the sensing chamber 201 through the second interface 252, the first connecting pipeline 25, and the first interface 251. The medium pressure is thus delivered to the sensing chamber. After the air in the working medium enters the sensing chamber, it is separated from the working medium because of different densities. The air is located above the sensing chamber. Because the vents 261 are arranged above the first interface 251, the air can be discharged out from the sensing chamber 201 and pass through the valve and the second connecting pipeline 26 and then flow to the downstream pipeline 32 of the main pipeline.

In addition, when the second interface 252 of the first connecting pipeline 25 is arranged at the upstream pipeline of the main pipeline, the third interface 262 of the second connecting pipeline 26 can be arranged at the low-voltage area in the inlet chamber; what to be attended is that the pressure of the working medium at the second interface 252 is greater than that of the working medium at the third interface 262; and the vents 261 are located above the first interface 251.

When the second interface 252 of the first connecting pipeline 25 is arranged at the inlet chamber 220 of the valve, the third interface 262 of the second connecting pipeline 26 can be arranged at the inlet chamber 220 of the valve; the third interface 262 is located in the low-voltage area in the inlet chamber 220, and the second interface 252 is arranged in the high-voltage area in the inlet chamber 220.

Figure 5:
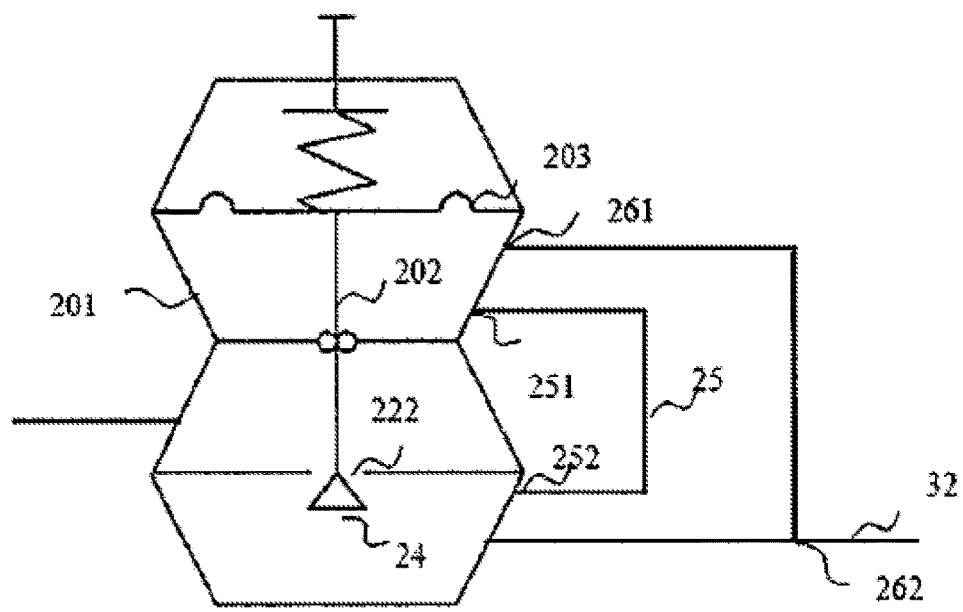
FIG. 5 is a schematic diagram of another valve constructed in accordance with the teachings of the present invention.

Similarly, when the second interface 252 of the first connecting pipeline 25 is arranged on the outlet chamber 221 of the valve, the third interface 262 of the second connecting pipeline 26 can be arranged on the outlet chamber 221 of the valve; the third interface 262 is located in the low-voltage area in the outlet chamber 221, and the second interface 252 is located in the high-voltage area in the outlet chamber 221. The third interface 262 of the second connecting pipeline 26 can be arranged on the downstream pipeline 32 of the main pipeline so as to ensure that the pressure of the working medium of the second connecting pipeline 26 at the third interface 262 is less than that of the working medium at the second interface 252. As shown in FIG. 5, the working medium can flow in the sensing chamber 201 along the first connecting pipeline 25 from the second interface 252, so that the membrane 203 can sense the pressure to adjust the opening of the flow control device 24 and the valve opening 222. In this manner, the pressure of the working medium in the downstream pipeline 32 of the main pipeline can be controlled. When the working medium flows into the sensing chamber 201 through the first connecting pipeline 25, the membrane 203 in the sensing chamber can sense the pressure and drive the drive shaft 202 accordingly. The fluid control device 24 controls the flow of the working medium at the valve opening 222. Because the vents 261 are located above the first interface 251, the air entering the sensing chamber 201 along with the working medium can be discharged out from the sensing chamber 201 via the vents 261, the second connecting pipeline 26, and the third interface 262. This prevents air from being retained in the sensing chamber 201 and ensures the working stability of the valve.

It will be appreciated that while the valve described in connection with example 1 is forward installed on the main pipeline, the valve can instead be backwards or side installed on the main pipeline; the pressure of the working medium at the second interface is greater than that of the working medium at the third interface of the second connecting pipeline; meanwhile, the first interface of the first connecting pipeline on the shell is in the vertical direction and is always located below the vents the second connecting pipeline on the shell.

Example 3

Figure 6:
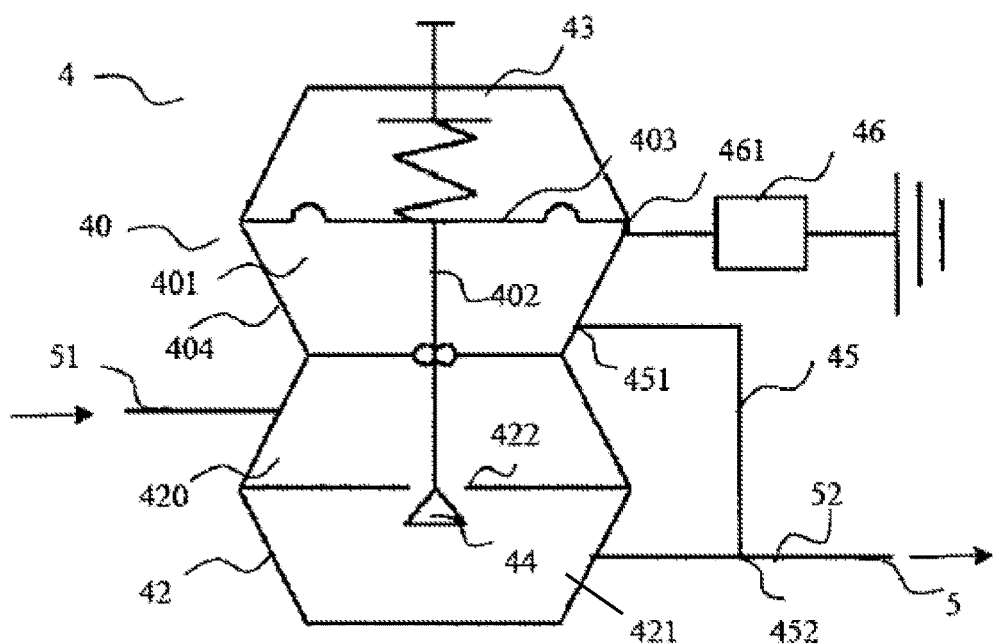
FIG. 6 is a schematic diagram of another valve constructed in accordance with the teachings of the present invention.

According to another aspect of the present invention, a valve 4, which is different than the valve 2, is provided. As shown in FIG. 6, the valve 4 is connected with the main fluid pipeline 5 to control the pressure of the working medium in the main pipeline 5. The valve 4 includes a drive device 40, a valve body 42, and an adjusting device 43, and the working medium is a liquid fluid.

Similar to the drive device described above in connection with example 2, the drive device 40 includes a sensing chamber 401 and a drive shaft 402. The sensing chamber 401 is composed of a membrane 403 and a shell 404. When the valve is in the working state, the working medium flows in the sensing chamber 401. The membrane 403 can sense the pressure of the working medium and moves according to the pressure of the working medium in the sensing chamber 401. The membrane 403 is connected with one end of the drive shaft 402, such that when the membrane 403 moves according to the pressure in the sensing chamber, the drive shaft 402 moves in a corresponding manner.

The valve body 42 includes an inlet chamber 420 and an outlet chamber 421 as well as a valve opening 422 between the inlet chamber 420 and the outlet chamber 421. The inlet chamber 420 is connected with the upstream pipeline 51 of the main pipeline, and the outlet chamber 421 is connected with the downstream pipeline 52 of the main pipeline. A flow control device 44 is arranged between the outlet chamber 421 and the inlet chamber 420 to control the flow of the working medium in the valve 4. The flow control device 44, which can, for example, be a clack valve, is connected with one end of the drive shaft 402. The clack valve 24 matches with the valve opening 422 to form the opening and closing states between the inlet chamber 420 and the outlet chamber 421.

The adjusting device 43 is used for presetting the standard pressure of the working medium at the downstream pipeline 52 of the main pipeline 5. When the membrane moves responsive to the pressure of the working medium in the sensing chamber 401, the adjusting device 43 can generate a relative force according to the moving range of the membrane 403: on one hand, the adjusting device 43 can buffer the moving range of the membrane, while on the other hand, the pressure of the working medium at the downstream pipeline 52 of the main pipeline 5 can be kept in the preset pressure value. Specifically, the drive shaft 402 drives the flow control device 44 to match with the valve opening 422, so that the flow flux of the working medium between the inlet chamber 420 and the outlet chamber 421 is kept in the steady range, and the pressure of the working medium flowing into the downstream pipeline 52 of the main pipeline is kept at the preset standard pressure.

The valve 4 in this example is further provided with a first connecting pipeline 45 which is arranged between the shell 404 and the downstream pipeline 52 of the main pipeline. A first interface 451 is arranged on the shell 404 and a second interface 452 is arranged on the downstream pipeline 52 of the main pipeline. When the working medium flows into the inlet chamber 420 from the upstream pipeline 51 of the main pipeline and flows into the downstream pipeline 52 of the main pipeline by the valve opening 422 and the outlet chamber 421, the working medium enters the sensing chamber 401 via the second interface 452, the first connecting pipeline 45, and the first interface 451. Stated another way, the pressure of the working medium at the downstream pipeline 52 of the main pipeline is delivered to the sensing chamber 401 of the drive device 40 by the first connecting pipeline 45. The sensing chamber 401 can drive the drive shaft 402 according to the pressure of the working medium, which in turn, drives the flow control device 44 at the other end. During this process, the flow control device 44 matches with the valve opening 422 to form the opening and closing states between the inlet chamber 420 and the outlet chamber 421.

Specifically, when the amount of the working medium in the downstream pipeline 52 of the main pipeline is increased, the pressure of the sensing chamber 401 is decreased, so that the membrane 403 drives the clack valve 44 downwards under the action force of the adjusting device 43. This enlarges the opening of the clack valve 44 and the valve opening 422, increasing the flow of the working medium flowing through the upstream pipeline 51 of the main pipeline, which raises the pressure of the outlet chamber 421 to maintain (i.e., keep constant) the downstream pressure of the main pipeline 5. Conversely, when the amount of the working medium in the downstream pipeline 52 of the main pipeline is decreased, the pressure of the sensing chamber 401 is raised, so that the membrane 403 drives the clack valve 44 upwards under the action force of the adjusting device 43. This decreases the opening of the clack valve 44 and the valve opening 422, so that the flow of the working medium flowing through the upstream pipeline 51 of the main pipeline is decreased, maintaining (i.e., keeping constant) the pressure of the downstream pipeline 52 of the main pipeline 5.

The valve 4 in this example further includes an air exhausting device 46 which is used for discharging the air in the sensing chamber 401. Specifically, the air exhausting device 46 is connected with the vents 461 on the shell 404, and the vents 461 are located above the first interface 451 of the first connecting pipeline 45. When the working medium mixed with the air enters the sensing chamber 401 along the first connecting pipeline 45, the air is above the working medium of the sensing chamber. When the air in the sensing chamber 401 accumulates to a certain degree, the valve 4 is unstable; thus the air exhausting device 46 on the vents 461 can be regularly opened, discharging the air in the sensing chamber 401 out of the sensing chamber. When the working medium is discharged to the air exhausting device 46, the air exhausting device 46 shows that the medium in the sensing chamber 401 has been discharged; at this time, the air exhausting device 46 is closed, and the valve can operate normally and stably.

The air exhausting device 46 in the example is a bulkhead, such as an end cap and the like.

The air exhausting device 46 in the example can alternatively be a vent valve, such as ball valve, single valve, etc.

As with the valve 2 described above in connection with example 2, the first connecting pipeline 45 can be arranged on the shell 404 and the outlet chamber 421. The working medium can flow from the outlet chamber 421 into the sensing chamber 401 along the first connecting pipeline 45, so that the membrane 403 can sense the pressure to adjust the opening of the flow control device 44 and the valve opening 422. In this manner, the pressure of the working medium at the downstream pipeline 52 of the main pipeline 5 can be controlled.

Figure 7:
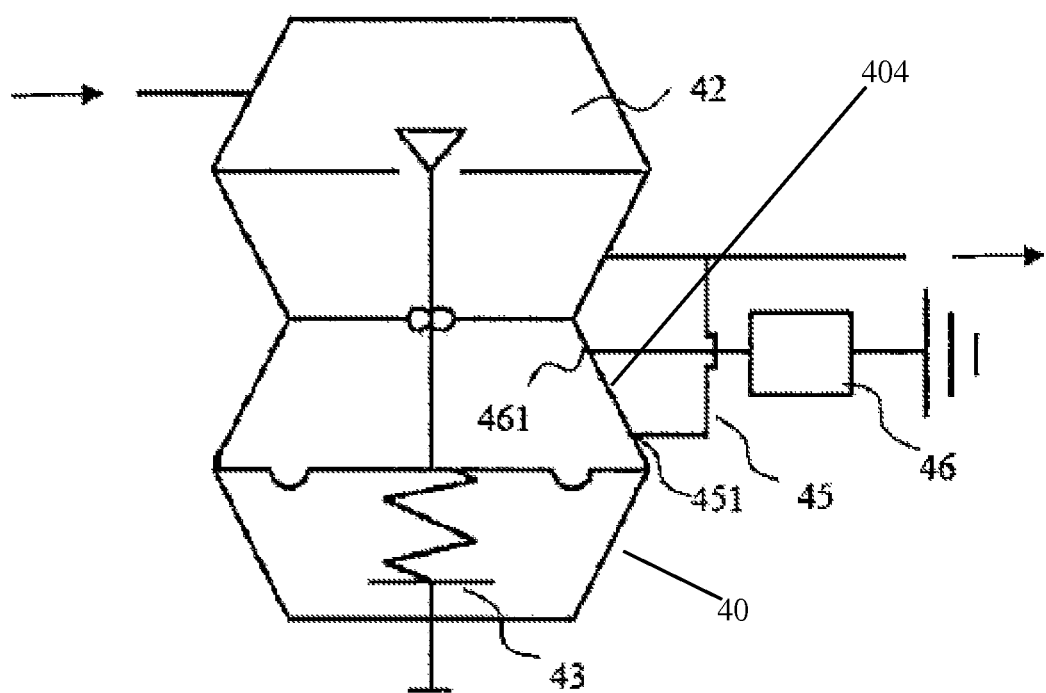
FIG. 7 is a schematic diagram of another inverted valve constructed in accordance with the teachings of the present invention.

Similarly, the valve 4 can be backwards installed on the main fluid pipeline 5, as shown in FIG. 7. In this example, the adjusting device 43 and the drive device 40 are located below the valve body 42, the vents 461 connected with the air exhausting device 46 are located vertically above the first interface 451 of the first connecting pipeline 45 on the shell 404, so that the gas above the sensing chamber 401 can be discharged out from the chamber. In addition, the example limits the position of the shell in the vertical direction only; and on this basis, it can be any position of the interface on the shell in the level direction.

Finally, it will be appreciated that the valve described herein can be a voltage regulator, a backpressure valve, or a control valve of which the pressure can be sensed and adjusted by other electronic sensing elements.

Although terms such as first, second and third can be used to describe various components, parts or portions, these components, parts or portions shall not be limited by these terms, and these terms are only used for distinguishing a component, part or portion. When numerical value terms such as "first" and "second" are used herein, they do not contain sequences or orders, unless otherwise clearly stated in the context.

The invention claimed is:

1. A valve adapted to be connected with a main fluid pipeline to control the pressure in the main fluid pipeline, the valve comprising:
   a drive device; and
   a valve body connected to the drive device;
   wherein the valve body comprises an inlet chamber and an outlet chamber, the inlet chamber adapted to be connected to an upstream pipeline of the main pipeline, and the outlet chamber adapted to be connected with a downstream pipeline of the main pipeline, the valve further comprising a flow control device arranged between the inlet chamber and outlet chamber, the flow control device configured to control a flow of a working medium in the valve body, and
   wherein the drive device comprises a sensing chamber and a drive shaft, the sensing chamber comprising a membrane and a shell, the drive shaft having one end connected to the membrane and another end connected to the flow control device, the drive device further comprising a vent arranged on the shell and configured to exhaust gas from the working medium out of the sensing chamber;
   a first connecting pipeline connected to the shell of the sensing chamber; and
   a second connecting pipeline connected to the shell of the sensing chamber, the second connecting pipeline fluidly connecting the vent and one of the downstream pipeline and the upstream pipeline of the main pipeline,
   wherein the membrane is configured to sense the pressure in the sensing chamber via the first connecting pipeline, and the membrane is configured to drive the drive shaft to move based on the sensed pressure.

2. The valve according to claim 1, wherein the flow control device comprises a clack valve arranged at the another end of the drive shaft, the valve further comprising a valve opening arranged in the valve body between the inlet chamber and the outlet chamber; wherein the clack valve matches with the valve opening, and the clack valve is movable relative to the valve opening to define opening and closing states of the valve.

3. The valve according to claim 1, wherein the second connecting pipeline fluidly connects the vent and the downstream pipeline of the main pipeline.

4. The valve according to claim 1, wherein the first connecting pipeline is connected to the shell of the sensing chamber at a first position, wherein the vent is located vertically above the first position.

5. The valve according to claim 4, wherein the first connecting pipe is arranged between the shell and a first portion of the downstream pipeline of the main pipeline, wherein the second connecting pipeline is arranged between the vent and a second portion of the downstream pipeline of the main pipeline, and wherein the second portion of the downstream pipeline of the main pipeline is located downstream of the first portion of the downstream pipeline of the main pipeline.

6. The valve according to claim 5, further comprising an air exhausting device connected with the vent, the air exhausting device configured to control the gas exhausted from the sensing chamber.

7. The valve according to claim 6, wherein the air exhausting device comprises a bulkhead or a vent valve.

8. The valve according to claim 4, wherein the first connecting pipeline is arranged between the shell and a first portion of the upstream pipeline of the main pipeline, wherein the second connecting pipeline is arranged between the vent and a second portion of the upstream pipeline of the main pipeline and wherein the second portion of the upstream pipeline of the main pipeline is located downstream of the first portion of the upstream pipeline of the main pipeline.

9. The valve according to claim 8, further comprising an air exhausting device connected with the vent, the air exhausting device configured to control the gas exhausted from the sensing chamber.

10. The valve according to claim 9, wherein the air exhausting device comprises a bulkhead or a vent valve.

11. The valve according to claim 4, further comprising an air exhausting device connected with the vent, the air exhausting device configured to control the gas exhausted from the sensing chamber.

12. The valve according to claim 11, wherein the air exhausting device comprises a bulkhead or a vent valve.

13. A valve adapted to be connected with a main fluid pipeline to control the pressure in the main fluid pipeline, the valve comprising:
   a drive device; and
   a valve body connected to the drive device;
   wherein the valve body comprises an inlet chamber and an outlet chamber, the inlet chamber adapted to be connected to an upstream pipeline of the main pipeline, and the outlet chamber adapted to be connected with a downstream pipeline of the main pipeline, the valve further comprising a flow control device arranged between the inlet chamber and outlet chamber, the flow control device configured to control a flow of a working medium in the valve body,
   wherein the drive device comprises a sensing chamber and a drive shaft, the sensing chamber comprising a membrane and a shell, the drive shaft having one end connected to the membrane and another end connected to the flow control device, the membrane configured to sense the pressure in the sensing chamber and drive the drive shaft to move based on the sensed pressure, the drive device further comprising a vent arranged on the shell;
   a first connecting pipeline connected to the shell of the sensing chamber at a first position, wherein the vent is located vertically above the first position, and wherein the first connecting pipe is arranged between the shell and a first portion of the downstream pipeline of the main pipeline; and
   a second connecting pipeline arranged between the vent and a second portion of the downstream pipeline of the main pipeline, wherein the second portion of the downstream pipeline of the main pipeline is located downstream of the first portion of the downstream pipeline of the main pipeline.

14. The valve according to claim 13, wherein the flow control device comprises a clack valve arranged at the another end of the drive shaft, the valve further comprising a valve opening arranged in the valve body between the inlet chamber and the outlet chamber, wherein the clack valve is movable relative to the valve opening to define opening and closing states of the valve.

15. The valve according to claim 13, further comprising an air exhausting device connected with the vent, the air exhausting device configured to control the gas exhausted from the sensing chamber.

16. The valve according to claim 15, wherein the air exhausting device comprises a bulkhead or a vent valve.

17. A valve adapted to be connected with a main fluid pipeline to control the pressure in the main fluid pipeline, the valve comprising:
- a drive device; and
- a valve body connected to the drive device;
- wherein the valve body comprises an inlet chamber and an outlet chamber, the inlet chamber adapted to be connected to an upstream pipeline of the main pipeline, and the outlet chamber adapted to be connected with a downstream pipeline of the main pipeline, the valve further comprising a flow control device arranged between the inlet chamber and outlet chamber, the flow control device configured to control a flow of a working medium in the valve body,
- wherein the drive device comprises a sensing chamber and a drive shaft, the sensing chamber comprising a membrane and a shell, the drive shaft having one end connected to the membrane and another end connected to the flow control device, the membrane configured to sense the pressure in the sensing chamber and drive the drive shaft to move based on the sensed pressure, the drive device further comprising a vent arranged on the shell;
- a first connecting pipeline connected to the shell of the sensing chamber at a first position, wherein the vent is located vertically above the first position, and wherein the first connecting pipeline is arranged between the shell and a first portion of the upstream pipeline of the main pipeline; and
- a second connecting pipeline arranged between the vent and a second portion of the upstream pipeline of the main pipeline; wherein the second portion of the upstream pipeline of the main pipeline is located downstream of the first portion of the upstream pipeline of the main pipeline.

18. The valve according to claim 17, wherein the flow control device comprises a clack valve arranged at the another end of the drive shaft, the valve further comprising a valve opening arranged in the valve body between the inlet chamber and the outlet chamber, wherein the clack valve is movable relative to the valve opening to define opening and closing states of the valve.

19. The valve according to claim 17, further comprising an air exhausting device connected with the vent, the air exhausting device configured to control gas exhausted from the sensing chamber.

20. The valve according to claim 19, wherein the air exhausting device comprises a bulkhead or a vent valve.

* * * * *

UNITED STATES PATENT AND TRADEMARK OFFICE
CERTIFICATE OF CORRECTION

PATENT NO.        : 9,541,926 B2
APPLICATION NO.   : 14/437817
DATED             : January 10, 2017
INVENTOR(S)       : Ping Huo et al.

Page 1 of 1

It is certified that error appears in the above-identified patent and that said Letters Patent is hereby corrected as shown below:

On the Title Page

At page 2, in Column 1, item (56), under "U.S. PATENT DOCUMENTS", Line 1, "Jeffrey" should be -- Jeffrey et al. --.

At page 2, in Column 2, item (56), under "U.S. PATENT DOCUMENTS", Line 10, "Zecchi" should be -- Zecchi et al. --.

In the Specification

At Column 5, Line 22, "clack valve clack" should be -- clack valve --.

Signed and Sealed this
Twentieth Day of March, 2018

Andrei Iancu
*Director of the United States Patent and Trademark Office*